US009748552B2

(12) United States Patent
Shen et al.

(10) Patent No.: US 9,748,552 B2
(45) Date of Patent: Aug. 29, 2017

(54) BATTERY HAVING PROTECTION COMPONENTS

(71) Applicant: BYD COMPANY LIMITED, Shenzhen (CN)

(72) Inventors: Xi Shen, Shenzhen (CN); Luxia Jiang, Shenzhen (CN); Jianhua Zhu, Shenzhen (CN); Shichao Hu, Shenzhen (CN); Gaowu Wang, Shenzhen (CN); Hongjuan Gu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 151 days.

(21) Appl. No.: 14/655,528

(22) PCT Filed: Sep. 12, 2013

(86) PCT No.: PCT/CN2013/083375
§ 371 (c)(1),
(2) Date: Jun. 25, 2015

(87) PCT Pub. No.: WO2014/101479
PCT Pub. Date: Jul. 3, 2014

(65) Prior Publication Data
US 2015/0364743 A1     Dec. 17, 2015

(30) Foreign Application Priority Data

Dec. 25, 2012  (CN) .......................... 2012 1 0566506
Dec. 25, 2012  (CN) .......................... 2012 1 0566932
Dec. 25, 2012  (CN) .................... 2012 2 0720224 U

(51) Int. Cl.
H01M 2/34       (2006.01)
H01M 10/04      (2006.01)
(Continued)

(52) U.S. Cl.
CPC ......... *H01M 2/34* (2013.01); *H01M 10/0413* (2013.01); *H01M 10/0431* (2013.01);
(Continued)

(58) Field of Classification Search
CPC ......... H01M 10/0413; H01M 10/0431; H01M 10/0463; H01M 10/0525; H01M 10/0585;
(Continued)

(56) References Cited

U.S. PATENT DOCUMENTS 8,968,908 B2      3/2015  Kim et al.
2001/0005559 A1   6/2001  Takemura et al.
(Continued)

FOREIGN PATENT DOCUMENTS

CN     101764252 A    6/2010
CN     201570552 U    9/2010
(Continued)

OTHER PUBLICATIONS

International Search Report and Written Opinion dated Nov. 20, 2013 for corresponding International Application No. PCT/CN2013/083375, filed Sep. 12, 2013.

*Primary Examiner* — Carlos Barcena
(74) *Attorney, Agent, or Firm* — David D. Brush; Westman Champlin & Koehler, P.A.

(57) ABSTRACT

A battery includes a shell, a core received in the shell and having first and second electrode tabs, and first and second protection components. Each of the first and second protection components includes two insulating layers and a conducting layer disposed between two insulating layers. The conducting layer of the first protection component defines a first end electrically connected to the first electrode tab and a second end configured as a free end. The conducting layer of the second protection component defines a first end (Continued)

electrically connected to the second electrode tab and a second end configured as a free end.

8 Claims, 1 Drawing Sheet

(51) Int. Cl.
    *H01M 10/6553*      (2014.01)
    *H01M 10/654*      (2014.01)
    *H01M 10/617*      (2014.01)
    *H01M 10/0525*      (2010.01)
    *H01M 10/0585*      (2010.01)
    *H01M 10/0587*      (2010.01)

(52) U.S. Cl.
    CPC ..... *H01M 10/0463* (2013.01); *H01M 10/617* (2015.04); *H01M 10/654* (2015.04); *H01M 10/6553* (2015.04); *H01M 10/0525* (2013.01); *H01M 10/0585* (2013.01); *H01M 10/0587* (2013.01); *H01M 2200/00* (2013.01); *H01M 2220/20* (2013.01); *Y02E 60/122* (2013.01)

(58) Field of Classification Search
    CPC ........... H01M 10/0587; H01M 10/617; H01M 10/654; H01M 10/6553; H01M 2200/00; H01M 2220/20; H01M 2/34
    See application file for complete search history.

(56) References Cited

U.S. PATENT DOCUMENTS

| | | |
|---|---|---|
| 2009/0047575 A1 | 2/2009 | Abe et al. |
| 2010/0159315 A1 | 6/2010 | Imasaka et al. |
| 2010/0330422 A1 | 12/2010 | Kim et al. |
| 2013/0029201 A1 | 1/2013 | Motohashi et al. |
| 2013/0045406 A1* | 2/2013 | Ahn ................ H01M 10/4235 429/94 |
| 2015/0229055 A1 | 8/2015 | Fukushima et al. |
| 2016/0006013 A1* | 1/2016 | Shen ................ H01M 10/0413 429/61 |

FOREIGN PATENT DOCUMENTS

| | | |
|---|---|---|
| CN | 101867069 A | 10/2010 |
| CN | 101931103 A | 12/2010 |
| CN | 202159747 U | 3/2012 |
| CN | 202308114 U | 7/2012 |
| CN | 202363549 U | 8/2012 |
| CN | 202395048 U | 8/2012 |
| CN | 203085673 U | 7/2013 |
| CN | 203085696 U | 7/2013 |
| EP | 2026403 A2 | 2/2009 |
| EP | 2197070 A1 | 6/2010 |
| EP | 2330661 A1 | 6/2011 |
| EP | 2408047 A1 | 1/2012 |
| EP | 2410594 A1 | 1/2012 |
| JP | H1167279 A | 3/1999 |
| JP | H1197066 A | 4/1999 |
| JP | 2005174686 A | 6/2005 |
| JP | 2008159328 A | 7/2008 |
| JP | 2009087600 A | 4/2009 |
| JP | 2010251197 A | 11/2010 |
| JP | 2011009182 A | 1/2011 |
| JP | 2011119260 A | 6/2011 |
| JP | 2011222230 A | 11/2011 |
| JP | 2012028315 A | 2/2012 |
| JP | 2014099256 A | 5/2014 |

* cited by examiner

BATTERY HAVING PROTECTION COMPONENTS

CROSS REFERENCE TO RELATED APPLICATIONS

This Application is a Section 371 National Stage Application of International Application No. PCT/CN2013/083375, filed Sep. 12, 2013, the content of which is incorporated herein by reference in its entirety, and published as WO 2014/101479 on Jul. 3, 2014, in English.

This Application also claims priority to and benefits of the following applications:

1) Chinese Patent Application Serial No. 201210566506.X, filed with the State Intellectual Property Office of P. R. China on Dec. 25, 2012;

2) Chinese Patent Application Serial No. 201210566932.3, filed with the State Intellectual Property Office of P. R. China on Dec. 25, 2012; and 3) Chinese Patent Application Serial No. 201220720224.6, filed with the State Intellectual Property Office of P. R. China on Dec. 25, 2012.

The entire content of the above applications are incorporated herein by reference.

FIELD

The present disclosure relates to the battery field, more particularly to a lithium ion battery.

BACKGROUND

In recent years, with gradual exhaustion of non-renewable resources, such as oil, and increasingly severe environmental damages, more and more attentions are paid on new energy vehicles. As the key role of the new energy vehicle, power battery has obtained increasingly higher attention nowadays.

However, during running of the power battery, there are many uncontrollable and extremely bad situations which may cause short circuit inside the battery. The short circuit may produce a lot of heat, which may damage the battery or harm the users, thus reduce the safety and reliability of the power battery. Accordingly, a safe and reliable battery is in need in this field.

SUMMARY

According to embodiments of the present disclosure, a battery is provided. The battery comprises: a shell; a core received in the shell and having first and second electrode tabs; and first and second protection components, each of the first and second protection components including two insulating layers and a conducting layer disposed between two insulating layers, in which the conducting layer of the first protection component defines a first end electrically connected to the first electrode tab and a second end configured as a free end, and the conducting layer of the second protection component defines a first end electrically connected to the second electrode tab and a second end configured as a free end.

In some embodiments of the present disclosure, the battery comprises one core, and the first and second protection components are disposed between the shell and the core.

In one embodiment of the present disclosure, the battery comprises at least two cores each connected with the first and second protection components, and the first and second protection components are disposed between the shell and the core, and/or between two adjacent cores.

In some embodiments of the present disclosure, the conducting layer is made by metal.

In one embodiment of the present disclosure, the insulating layer is made by at least one selected from a group consisting of: an insulating ceramic material, an insulating coating material, and an insulating plastic material.

In yet one embodiment of the present disclosure, the insulating layer and a separator of the core are made by the same material.

In some embodiments of the present disclosure, the first electrode tab is disposed at a first end of the core, and the second electrode tab is disposed at a second end of the core.

In one embodiment of the present disclosure, the first and second electrode tabs are disposed at the same end of the core.

According to embodiments of the present disclosure, the battery comprises two protection components connected to the core, specially, the first protection component is electrically connected to the first electrode tab (for example, the positive electrode tab), while the second protection component is electrically connected to the second electrode tab (for example, the negative electrode tab). When the battery is deformed due to an external force, the two protection components are capable of automatically forming a short circuit in the battery, for example, a short circuit between positive and negative electrode current collectors. Therefore, the heat produced by the short circuit may be reduced to a minimum amount. In addition, the heat conduction path in the battery may be shortened. That is to say, not only the heat production rate may be reduced, but also the heat dissipation time may be increased. Thus, the safety and reliability of the battery may be improved, even under poorer situations. In addition, when the battery according to embodiments of the present disclosure is working normally, the heat dissipation speed may be increased, which facilitates to achieve a heat balance inside the battery.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
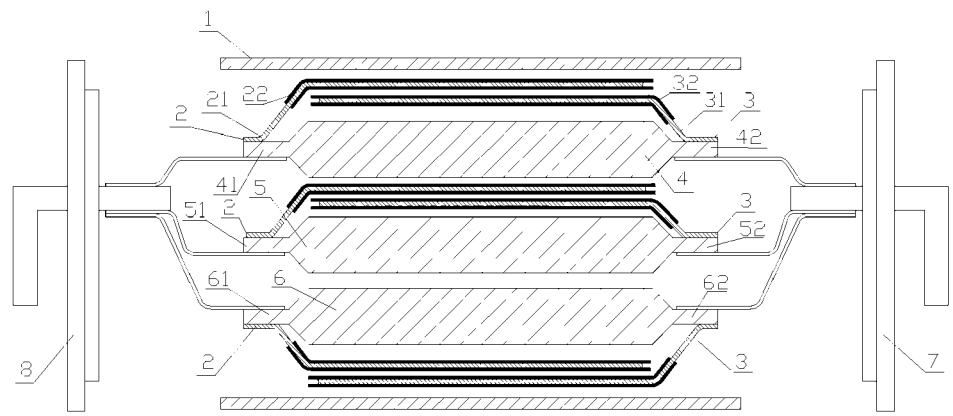
FIG. 1 is a schematic view of a battery according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It should be understood that the term "battery" in the present disclosure may refer to a lithium ion battery or the like.

Figure 2:
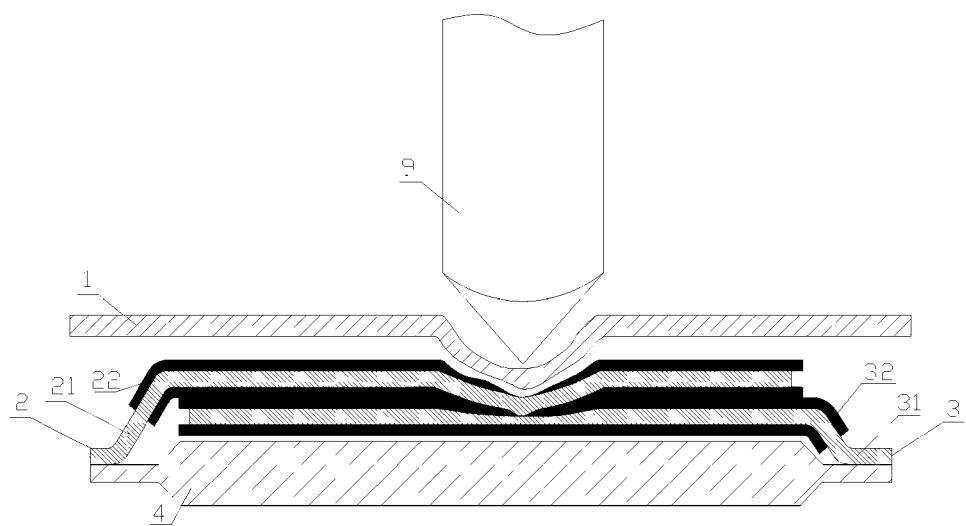
FIG. 2 is a schematic view of a battery according to an embodiment of the present disclosure, in which the battery is in a first unfavorable condition.
Figure 3:
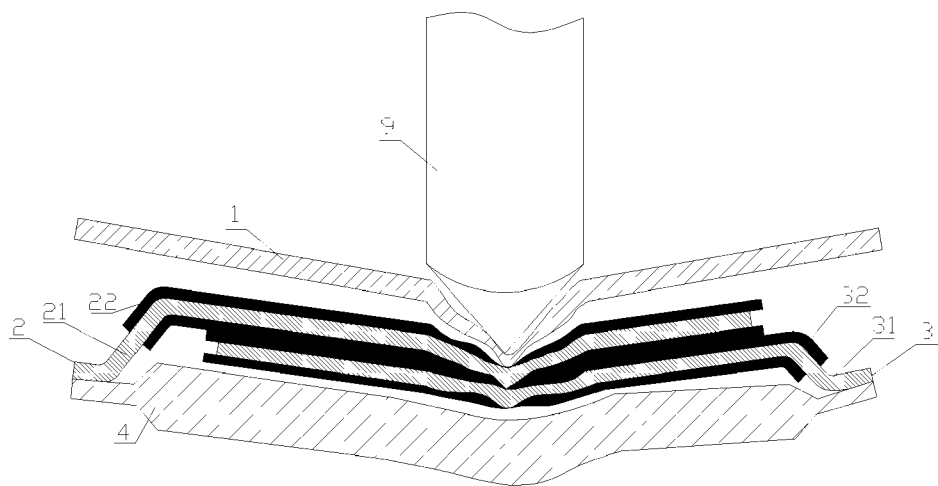
FIG. 3 is a schematic view of a battery according to another embodiment of the present disclosure, in which the battery is in a second unfavorable condition.

According to embodiments of the present disclosure, as shown in FIGS. 1-3, there is provided a battery. The battery comprises: a shell 1; a core 4 received in the shell and having first and second electrode tabs 41, 42; and a first protection component 2 and a second protection component 3 having the same structure, each of the first and second protection components 2, 3 including two insulating layers and a conducting layer disposed between two insulating layers, in which the conducting layer 21 of the first protection component 2 defines a first end electrically connected to the first electrode tab 41 and a second end configured as a free end, and the conducting layer 31 of the second protection component 3 defines a first end electrically connected to the second electrode tab 42 and a second end configured as a free end.

In the present disclosure, the battery may comprise one or more cores. The core may have a winding structure or a stack structure formed by several layers, without limitation in the present disclosure. In some embodiments of the present disclosure, the first electrode tab is disposed at a first end of the core, and the second electrode tab is disposed at a second, opposite end of the core. In some embodiments, the first and second electrode tabs are disposed at the same end of the core.

In one embodiment, the first electrode tab is a positive electrode tab, and the second electrode tab is a negative electrode tab. In another embodiment, the first electrode tab is a negative electrode tab, and the second electrode tab is a positive electrode tab. It should be noted that there are no special limitations for the polarity of the first and second electrode tabs.

In some embodiments, the free end of the first protection component 2 may be covered by the insulating layers 22 of the first protection component 2, i.e. the free end of the conducting layer 21 of the first protection component 2 may be sealed by the insulating layers 22 of the first protection component 2. Alternatively, the free end of the conducting layer 21 of the first protection component 2 may not be sealed by the insulating layer 22 of the first protection component 2.

In some embodiments, the free end of the second protection component 3 may be covered by the insulating layers 32 of the second protection component 3, i.e. the free end of the conducting layer 31 of the second protection component 3 may be sealed by the insulating layers 32 of the second protection component 3. Alternatively, the free end of the conducting layer 31 of the second protection component 3 may not be sealed by the insulating layer 32 of the second protection component 3.

A battery comprising three cores 4, 5, 6 will be described in details below as an example, in which each of the first and second protection components is formed by two insulating layers and one conducting layer disposed there between, also named as a stacked structure. As shown in FIG. 1, in the present example, each core comprises first and second electrode tabs, and the first electrode tab is a positive electrode tab, and the second electrode tab is a negative electrode tab.

As shown in FIG. 1, the battery comprises a shell 1, two cover plates 7, 8 (a positive cover plate 8 and a negative cover plate 7) configured to define a cavity with the shell 1, and three cores 4, 5, 6 received in the cavity. It is known that, the battery further comprises electrolyte solution enclosed in the cavity.

In some embodiments of the present disclosure, the shell 1 may be made by metal or other conductive material.

In some embodiments, the core defines a first electrode tab (for example, a positive electrode tab) at a first end thereof and a second electrode tab (for example, a negative electrode tab) at a second end thereof. As shown in FIG. 1, the core 4 comprises positive and negative electrode tabs 41, 42; the core 5 comprises positive and negative electrode tabs 51, 52; and the core 6 comprises positive and negative electrode tabs 61, 62.

In some embodiments, the battery comprises at least two cores and each core is connected with two protection components (the first and second protection components) disposed between the shell and the core, and/or between two adjacent cores.

In an embodiment, each core is connected with two protection components (the first and second protection components). As shown in FIG. 1, the two protection components connected to the core 4 are disposed between the shell 1 and the core 4; the two protection components connected to the core 5 are disposed between the core 4 and the core 5; and the two protection components connected to the core 6 are disposed between the core 6 and the shell 1.

In the present disclosure, each of the first and second protection components connected to the three cores has a same structure, specifically, has the structure formed by three stacked layers, i.e. two insulating layers and a conducting layer disposed therebetween. Referring to FIG. 1, the first protection component 2 includes two insulating layers 22 and a conducting layer 21 disposed between the two the insulating layers 22; the second protection component 3 includes two insulating layers 32 and a conducting layer 31 disposed between the two the insulating layers 32.

In some embodiments, the conducting layer of the protection component is connected to the positive electrode tab, then the protection component is a positive electrode protection component. In some embodiments, if the conducting layer of the protection component is connected to the negative electrode tab, then the protection component is a negative electrode protection component. Each core is connected to first and second protection components, in which one is the positive electrode protection component, and the other is the negative electrode protection component.

As shown in FIG. 1, in the present example, the first and second protection components 2, 3 are connected with the core 4. The conducting layer 21 of the first protection component 2 is connected electrically with the positive electrode tab 41 of the core 4, and the first protection component 2 is the positive electrode protection component. The conducting layer 31 of the second protection component 3 is connected electrically with the negative electrode tab 42 of the core 4, and the second protection component 3 is the negative electrode protection component. The positive and negative electrode protection components are stacked with each other, and both disposed between the core 4 and the shell 1. The first end of the conducting layer 21 is electrically connected to the positive electrode tab 41 (that is, the first end of the conducting layer 21 is connected to the positive electrode current collector of the core 4) and the second end of the conducting layer 21 is a free end. The first end of the conducting layer 31 is electrically connected to the negative electrode tab 42 (that is, the first end of the conducting layer 21 is electrically connected to the negative electrode current collector of the core 4), and the second end of the conducting layer 31 is a free end.

As shown in FIG. 1, in the present example, the first and second protection components 2, 3 are connected with the core 5. The conducting layer 21 of the first protection component 2 is connected electrically with the positive electrode tab 51 of the core 5, and the first protection component 2 is the positive electrode protection component. The conducting layer 31 of the second protection component 3 is connected electrically with the negative electrode tab 52 of the core 5, and the second protection component 3 is the negative electrode protection component. The positive and negative electrode protection components are stacked with each other, and both disposed between the core 4 and the core 5. The first end of the conducting layer 21 is electrically connected to the positive electrode tab 51 (that is, the first end of the conducting layer 21 is connected to the positive electrode current collector of the core 5) and the second end of the conducting layer 21 is a free end. The first end of the conducting layer 31 is electrically connected to the negative electrode tab 52 (that is, the first end of the conducting layer 21 is electrically connected to the negative electrode current collector of the core 5), and the second end of the conducting layer 31 is a free end.

As shown in FIG. 1, in the present example, the first and second protection components 2, 3 are connected with the core 6. The conducting layer 21 of the first protection component 2 is connected electrically with the positive electrode tab 61 of the core 6, and the first protection component 2 is the positive electrode protection component. The conducting layer 31 of the second protection component 3 is connected electrically with the negative electrode tab 62 of the core 6, and the second protection component 3 is the negative electrode protection component. The positive and negative electrode protection components are stacked with each other, and both disposed between the core 6 and the shell 1. The first end of the conducting layer 21 is electrically connected to the positive electrode tab 61 (that is, the first end of the conducting layer 21 is connected to the positive electrode current collector of the core 6) and the second end of the conducting layer 21 is a free end. The first end of the conducting layer 31 is electrically connected to the negative electrode tab 62 (that is, the first end of the conducting layer 21 is electrically connected to the negative electrode current collector of the core 6), and the second end of the conducting layer 31 is a free end.

In some embodiments of the present disclosure, the conducting layer may be made by metal having an excellent heat-conducting property. In some embodiments, the conducting layer and the electrode tab which is connected to the conducting layer are made of the same metal. For example, the metal may be copper or aluminum, without limitation in the present disclosure.

In some embodiments of the present disclosure, the insulating layer is made by at least one selected from a group consisting of: an insulating ceramic material, an insulating coating material, and an insulating plastic material. In some embodiments of the present disclosure, the insulating layer is made by material having a low deformation temperature. In one embodiment of the present disclosure, the insulating layer and a separator layer of the battery is made by the same material. It should be noted that if the protection component is disposed between the shell and the core, the insulating layer between the shell and the core could be substituted by the separator layer surrounding the core.

It has been surprisingly found by the inventors that when the battery is in an unfavorable situation (for example, subjected to a serious impact, extruding, or press), short circuits caused in the core are very complicated, including a short circuit between the positive electrode current collector and the negative electrode materials, a short circuit between the negative electrode current collector and the positive electrode materials, a short circuit between the positive and negative electrode materials, and a short circuit between the positive and negative electrode current collectors. Different short circuits may have different heat production rates. The inventors have found that, under the same situation, a first heat produced by the short circuit between the positive and negative electrodes is the maximum, while a second heat produced by the short circuit between the positive and negative electrode current collectors is the minimum, in which the first heat is ten times of the second heat. And a heat production rate of first heat is about two or even three times of that of the second heat.

As described above, with the battery according to embodiments of the improvement of the present disclosure, when the battery is deformed by an external force, the complicated short circuits occurred inside the battery may be changed. The short circuit between the positive and negative electrode current collectors may occur firstly, in which the produced heat and the heat production rate are both the minimum, thus the safety and reliability of the battery may be improved.

Specifically, the working principle of the battery according to embodiments of the present disclosure will be described in details below.

(1) When the battery is working normally.

The cores 4, 5, 6 each are connected with first and second protection components 2, 3 respectively, and each of the first and second protection components 2, 3 includes a conducting layer which has an excellent heat conduction performance. Therefore, the heat dissipation path inside the battery may be: current collector—conducting layer of the protection component—insulating layer of the protection component—shell. On one hand, the heat conduction path is greatly shortened; on the other hand, the heat conduction path may have a lower heat resistance. Therefore, a heat-conducting property of the battery may be improved and the heat dissipation speed may be increased, which facilitates to form a heat balance inside the battery, so that a local temperature increase (up to an extremely high value) may be avoided.

(2) When the battery is working in a first unfavorable condition (for example, as shown in FIG. 2, when the battery is extruded or pressed with an external material 9).

In the present example, with the action of the produced heat and an external force from the external material 9, the two insulating layers 22 of the first protection component 2 and the two insulating layers 32 of the second protection component 3 will be destroyed quickly, and middle portions of the conducting layer 21 of the first protection component 2 and the conducting layer 31 of the second protection component 3 will be deformed, so as to contact with each other at the first time. As the first end of the conducting layer 21 is electrically connected to the positive electrode tab 41 (thus connected with positive electrode current collector) of the core 4, and the first end of the conducting layer 31 is electrically connected to the negative electrode tab 42 (thus connected with negative electrode current collector) of the core 4, the short circuit between the positive and negative electrode current collectors of the core 4 may occur firstly. In a condition of this kind of short circuit, the produced heat is the minimum, which is about one tenth to about one third of those produced by a conventional battery. In addition, the heat production rate is relatively lower in the present example. Therefore, a heat dissipation time of the battery will be increased, thus the heat produced in the unfavorable condition may be reduced. With the short circuit between the positive and negative electrode current collectors, most of energy inside the battery may be consumed before the complicated short circuits occurred inside the battery. As the energy inside the battery is almost used up, the heat produced by the following complicated short circuits is also less, thus the risk of overheating, catching fire, and explosion of the battery will be efficiently decreased.

In addition, the conducting state between the conducting layer 21 of the first protection component 2 and the conducting layer 31 of the second protection component 3 will be maintained for a certain time period, as shown in FIG. 3. Because the second ends of the conducting layer 21 of the first protection component 2 and the conducting layer 31 of the second protection component 3 are both free ends, the free ends will act (for example, turned upwardly) accordingly with the penetrating of the external material 9, until the conducting layer 21 and the conducting layer 31 are both broken. To break the conducting layers 21, 31 needs a certain time period, therefore the short circuit inside the battery will be kept for a certain time period when the energy inside the battery is almost consumed. Thus, the safety performance of the battery may be greatly improved.

According to some embodiments of the present disclosure, the protection components connected to other cores (such as core 5, core 6) have a similar working principle with that of the protection component connected to the core 4, thus the detailed description will be omitted here.

With the further penetration of the external material 9 into the battery, as shown in FIG. 3, the shell 1 will finally electrically contact to the conducting layer 21 of the protection component 2. In this way, the heat dissipation path inside the battery may be: current collector—conducting layer of the positive electrode protection component—conducting layer of the negative electrode protection component—shell. The heat dissipation path is further shortened. As the all material relating to the heat dissipation path has good heat-conducting property, thus the heat dissipation speed is faster, and the safety and reliability performances of the battery under extremely unfavorable situations will be further improved.

As described above, the battery comprises two protection components connected to the core, specially, the first protection component is electrically connected to the first electrode tab (for example, the positive electrode tab), while the second protection component is electrically connected to the second electrode tab (for example, the negative electrode tab). When the battery is deformed due to an external force, the two protection components are capable of automatically forming a short circuit in the battery, for example, a short circuit between positive and negative electrode current collectors. Therefore, the heat produced by the short circuit may be reduced to a minimum amount. In addition, the heat conduction path in the battery may be shortened. That is to say, not only the heat production rate may be reduced, but also the heat dissipation time may be increased. Thus, the safety and reliability of the battery may be improved, even under poorer situations. When the battery according to embodiments of the present disclosure is working normally, the heat dissipation speed may be increased, which facilitates to achieve a heat balance inside the battery.

One or more embodiments of the present disclosure seek to solve at least one of the problems existing in the prior art to at least some extent, and provide a battery which is reliable and safe even used in an unfavorable condition.

Reference throughout this specification to "an embodiment," "some embodiments," "one embodiment," or "an example" means that a particular feature, structure, material, or characteristic described in connection with the embodiment or example is included in at least one embodiment or example of the present disclosure. Thus, the appearances of the phrases such as "in some embodiments," "in one embodiment," "in an embodiment," or "in the example" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A battery, comprising:
    a shell;
    a core received in the shell and having first and second electrode tabs; and
    first and second protection components, each of the first and second protection components including two insulating layers and a conducting layer disposed between the two insulating layers,
    wherein the conducting layer of the first protection component defines a first end electrically connected to the first electrode tab and a second end configured as a free end, and the conducting layer of the second protection component defines a first end electrically connected to the second electrode tab and a second end configured as a free end.
2. The battery according to claim 1, wherein the battery comprises one core, and the first and second protection components are disposed between the shell and the core.
3. The battery according to claim 1, wherein the battery comprises at least two cores each connected with the first and second protection components, and the first and second protection components are disposed between the shell and the core, and/or between two adjacent cores.
4. The battery according to claim 1, wherein the conducting layer is made of metal.
5. The battery according to claim 1, wherein the insulating layer is made of at least one selected from a group consisting of: an insulating ceramic material, an insulating coating material, and an insulating plastic material.
6. The battery according to claim 1, wherein the insulating layer and a separator of the core are made of the same material.
7. The battery according to claim 1, wherein the first electrode tab is disposed at a first end of the core, and the second electrode tab is disposed at a second end of the core.
8. The battery according to claim 1, wherein the first and second electrode tabs are disposed at the same end of the core.

* * * * *